Oct. 30, 1962    E. SCHÖNINGER    3,061,796
ELECTRIC DRIVE DEVICE FOR DRIVING A MECHANICAL
OSCILLATORY SYSTEM
Filed Sept. 1, 1959

INVENTOR.
EDGAR SCHÖNINGER
BY
Davis, Hoxie, Faithfull & Hapgood
ATTORNEYS.

United States Patent Office 3,061,796
Patented Oct. 30, 1962

3,061,796
ELECTRIC DRIVE DEVICE FOR DRIVING A MECHANICAL OSCILLATORY SYSTEM
Edgar Schöninger, Munich-Allach, Germany, assignor to Durowe, A.G., Pforzheim, Germany, a corporation of Germany
Filed Sept. 1, 1959, Ser. No. 837,470
Claims priority, application Germany Sept. 3, 1958
8 Claims. (Cl. 331—110)

This invention relates to an electro-mechanical oscillatory system capable of providing precisely timed mechanical impulses to a time indicating device and in particular relates to an electro-mechanical escapement mechanism and circuit suitable for electronic watches and clocks having no mainspring or weight driving systems.

Systems of this type are well known in the art, but have, for reasons to be discussed below, disadvantages which my invention overcomes.

In one well known system an oscillatory mechanism with a self-contained drive coil cooperates with a stationary coil and permanent magnets. In that circuit the moving coil is coupled to the output and the stationary coil is coupled to the input of an amplifier. The coils are so coupled that when the system is at rest, the electronic system oscillates at a natural resonant frequency considerably higher than that of the mechanical oscillatory system. The current in the driving coil is a pulsating D.C. current which generates an attractive force between the driving coil and the permanent magnets causing the mechanism to oscillate of its own accord. This system is self-regulating in that the drive pulse width is dependent on the arc of oscillation of the mechanical system. This arrangement has one disadvantage in that the amplifier loop gain must be limited in the at rest condition, impairing the circuit efficiency at the extremeties of the mechanical oscillation. A second disadvantage is that two coils are required.

Another proposed arrangement provides only a single coil mounted on the rotating assembly to oscillate in a permanent magnetic field. The coil is connected to a relaxation oscillator of the saw-tooth type. Oscillation of the balance wheel produces synchronizing impulses for the relaxation oscillator which discharges through the coil to produce the driving impulse. The disadvantage here is, that small amplitude oscillations of the wheel produce small synchronizing signals making it extremely difficult to achieve synchronization. If the natural resonant frequency of the relaxation oscillator differs slightly from the natural resonant frequency of the mechanical element all synchronization is lost, and the relaxation oscillator takes control at its natural resonant frequency. Here, the driving pulse is of constant width and no self-regulation is achieved.

My present invention overcomes the disadvantages of the prior systems and provides a novel arrangement whereby self-regulation is attained in a simple circuit requiring but one coil connected into the input and output circuits of a transistor amplifier.

I will now described my system in detail in reference to the drawings, of which:

Figure 1:
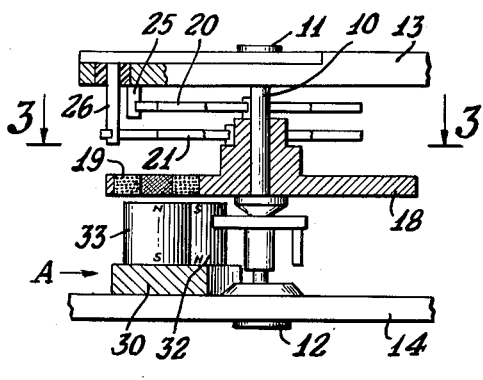
FIG. 1 is a cross-sectional view of the mechanical assembly taken along line 1—1 of FIGURE 3.
Figure 3:
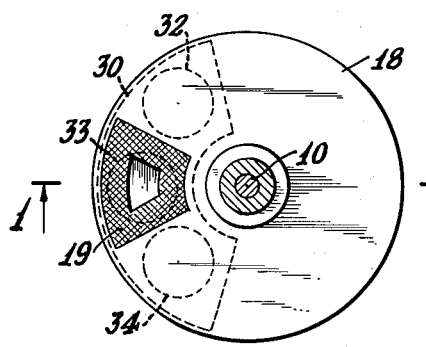
FIG. 3 is a sectional view on line 3—3 of FIG. 1, showing the balance wheel and permanent magnet arrangement when the balance wheel is at rest in its neutral position.

In FIG. 1 a balance staff 10 is supported at 11 in a plate 13 and at 12 in a bridge 14. Fastened to the balance staff 10 is the disc-shaped oscillatory member or balance wheel 18 having inset therein a coil 19 near the outer periphery. Preferably, the coil should be of such a shape that a maximum number of turns intersect the magnetic lines of the permanent magnets in a direction at right angles to the direction of movement. The trapezoidal coil, as illustrated in FIG. 3, or a triangular coil will fulfill these requirements. Two balance spring 20 and 21 are coupled between the balance staff 10 and the plate 13 in the usual manner. I use two balance springs instead of the usual single spring in order to utilize them as means of making electrical connections to the coil 19, and for that reason one of them, namely spring 21, is secured to an insulated post 26. I have omitted showing the details of the electrical connections to the coil 19 or to the external circuit in order to simplify the drawing.

Beneath the rotating element 18 is the usual roller table with its roller jewel, not numbered, to impart the rotational energy to the train, not shown. The method of transferring the oscillatory motion to the train may be by any of the well known methods, such as those illustrated in the United States patents numbered 2,789,411 and 2,800,763 granted to G. G. Ensign et al., issued on April 23, 1957, and July 30, 1957, respectively.

Figure 2:
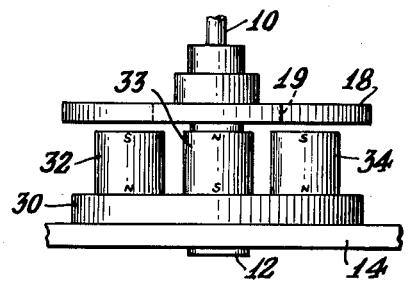
FIG. 2 is an elevation view of part of the mechanical assembly as seen looking in the direction of the arrow A of FIG. 1.

Secured to the bridge 14, as seen in FIGS. 1 and 2, is a yoke 30 of magnetic material on which are disposed three permanent magnets 32, 33 and 34, positioned as seen in the dotted lines of FIG. 3 to react with the moving coil 19. In the neutral position of the balance wheel 18 the centerline of the coil 19 does not overlie the centerline of the central magnet 33, but is slightly offset with respect to it. This is done to provide an initial magnetic bias on the coil 19 to set the balance wheel in motion on receipt of the initial pulse.

Figure 4:
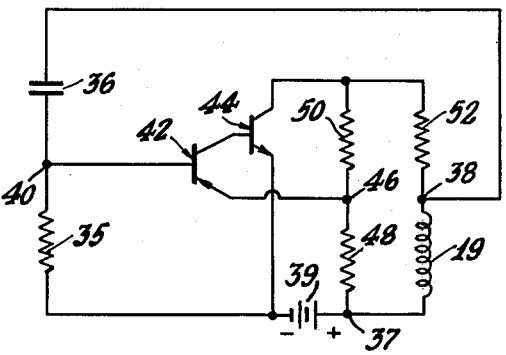
FIG. 4 is the electrical circuit schematic diagram.

The electrical circuit schematic is shown in FIG. 4. The circuit comprises a two transistor amplifier to amplify the synchronizing signal from, and to impart a driving pulse to, the coil 19. The transistor amplifier circuit is novel in that the first, or control transistor, 42 is of the PNP variety and the second, or driver transistor, 44 is of the opposite polarity or NPN type. This enables having a directly connected amplifier with a minimum of coupling elements and but a single power source, battery 39. The amplifier functions as a normal two stage amplifier in that the phase of the output voltage at the collector of the driver transistor 44 is the same phase as the input voltage to the base of the control transistor 42. Positive voltage for transistor 44 is obtained from battery 39 by way of coil 19 and resistor 52 which serves as a current limiting device. Operating potential for the control transistor 42 is obtained from the direct connection of its collector to the base of transistor 44, and its emitter is connected to the center of the potential divider consisting of resistors 48 and 50 between the collector of transistor 44 and the positive pole 37 of the battery 39. Base bias for transistor 42 is provided through resistor 35 connected to the negative pole of the battery 39.

In operation, when the circuit is initially energized, the battery, being suddenly connected to the series circuit including coil 19, capacitor 36 and resistor 35, generates a low frequency oscillation determined by the charging current of the R.C. combination. This exponentially decreasing current develops an in-phase voltage across resistance 35 at the input circuit of the amplifier which, when amplified, delivers a driving pulse in coil 19 of such polarity as to cause the balance wheel 18 to rotate. As the coil swings past the permanent magnets cutting their magnetic lines a pulse is introduced into coil 19. This pulse is applied to the input circuit by way of capacitor 36, is amplified in the two stage amplifier and again applied to the coil 19 as a driving pulse. In order that the amplifier differentiate between the induced pulse and the generated pulse, both of which appear at the amplifier input, the emitter electrode of the input transistor 42 is connected to the voltage divider consisting of resistors 48 and 50 across the output circuit. The net effect of these connections is to increase the voltage of the base and emitter electrodes of the control transistor 42 in the same direction at the same time to produce a cancellation of the driving pulse in the control circuit. The same result is produced in a vacuum tube amplifier when the same pulses are introduced into the grid and cathode electrodes simultaneously. Where the net potential change between the input electrodes is zero no disturbance is generated in the output. While complete cancellation of the driving pulse is not effected in the control transistor 42, it is so sufficiently complete that the driving pulse is approximately the same size and shape as the control pulse. This not only assures synchronization, but also adds the feature of self-regulation since the width of the drive pulse is inversely proportional to the amplitude of mechanical oscillation. That is, small amplitudes of balance wheel oscillation generate drive pulses of greater width, thus imparting more energy to the system to increase the amplitude of swing.

In the preferred embodiment of my novel circuit I have found that the following values of the electronic components give satisfactory results:

$R_{35}$=0.1–10 megohms, preferably 3 megohms
$R_{48}$=1–70 kilo-ohms, preferably 15 kilo-ohms
$R_{50}$=1–70 kilo-ohms, preferably 15 kilo-ohms
$R_{52}$=0.25–5 kilo-ohms, preferably 1.5 kilo-ohms
$C_{36}$=0.05–10 microfarads, preferably 1 microfarad
$L_{19}$=0.5–1000 millihenries, preferably 15 millihenries
$E_{39}$=1–10 volts, preferably 1.35 volts
$R_{19}$=0.1–10 kilo-ohms, preferably 2 kilo-ohms It is to be noted that resistors 48, 50 and 52 form an electrical bridge circuit with coil 19. The drive pulse is applied across one diagonal of the bridge and the input to the control transistor 42 is taken across the other diagonal of the bridge between points 38 and 46.

I claim:

1. An electro-mechanical timing system comprising a spring-loaded mechanically oscillatory balance wheel, an inductance coil on said wheel, an array of fixed permanent magnets, said coil being adapted to intersect the magnet field lines of said magnets to induce control pulses in the coil during oscillation of said wheel and to transmit driving pulses to the system to maintain said oscillations, and a self-oscillating transistor multivibrator circuit having a 2-terminal input circuit, an output circuit, a feedback circuit and a source of energizing potential, said output circuit having a load circuit serially connected with said energy source, the load circuit having a resistance and said coil as elements thereof, said output circuit also having a voltage divider network in parallel therewith, said feedback circuit including a capacitor connected between a point on said load circuit and one of the input terminals and a connection between a point on said voltage divider and the other terminal of said input circuit.

2. An energy supply circuit for a coil carrying electro-mechanical oscillatory system comprising an input PNP transistor and an output NPN transistor directly coupled thereto, a four element bridge circuit and a source of energizing potential, said bridge including at least one resistive element and said coil element, the output circuit of said output transistor being connected across one diagonal of said bridge circuit in series with said voltage source, the conductive path for said source including the resistive element and the output circuit of said output transistor, the input of said input transistor being connected across the other diagonal of said bridge circuit.

3. An electro-mechanical timing system comprising a spring-loaded mechanically oscillatory balance wheel, an inductance coil on said wheel, at least one fixed permanent magnet, said coil being adapted to intersect the magnet field lines of said magnet to induce control pulses in the coil during oscillation, a self-oscillating transistor circuit having input and output circuits coupled to a four element bridge circuit having the coil as a bridge member, the other bridge members being resistances, the output circuit being connected to one diagonal of the bridge circuit and the input circuit being connected across the other diagonal of the bridge circuit.

4. An electro-mechanical timing system comprising a spring-loaded mechanically oscillatory balance wheel, an inductance coil on said wheel, at least one fixed permanent magnet, said coil being adapted to intersect the magnetic field lines of said magnet to induce control pulses in the coil during oscillation, a self-oscillating transistor circuit having input and output circuits coupled to, a four-terminal circuit, a bridge circuit being a part of this four-terminal circuit, said coil being a bridge member the other bridge member being resistances, the output circuit being connected to one diagonal of the bridge circuit and the input circuit being connected across the other diagonal of the bridge circuit.

5. An electro-mechanical timing system comprising a spring-loaded mechanically oscillatory balance wheel, an inductance coil on said wheel, at least one fixed permanent magnet, said coil being adapted to intersect the magnet field lines of said magnet to induce control pulses in the coil during oscillation, a self-oscillating transistor circuit having input and output circuits coupled to a bridge circuit having said coil as one element and the other elements being resistances, the output circuit being connected to one diagonal of the bridge circuit in series with a source of electric energy and the input circuit being connected across the other diagonal of the bridge circuit, a capacitive element in series with the input circuit, a resistance element between one terminal of the input circuit and one terminal of the output circuit, whereby the entire arrangement operates as a multivibrator.

6. A transistor amplifier comprising first and second directly connected complementary transistors, a four element impedance bridge and a source of transistor operating potential, the output circuit of said amplifier being directly connected across a series circuit including a diagonal of said impedance bridge and said source, the input circuit of said amplifier being capacitively coupled across the other diagonal of said bridge, one element of said impedance bridge being inductive and the others being resistive.

7. A transistor amplifier comprising a PNP input transistor and an NPN output transistor, each having base, emitter and collector terminals, the collector of said input transistor being directly connected to the base of said output transistor, an impedance bridge having an inductive element, a source of energizing potential, said bridge and said source being serially connected between the collector and emitter of said output transistor, the emitter of said input transistor being connected to a point on said bridge circuit, the base of said input transistor being resistively connected to said source, and a capacitive element coupled between the base of said input transistor and a different point on said bridge.

8. A self-starting electro-mechanical oscillatory system comprising a magnetic circuit including a permanent magnet array member and a coil member, an oscillatory balance wheel and hairspring assembly disposed to mechanically oscillate at a first resonant frequency, and an electronic circuit, one of the members of said magnetic circuit being disposed for movement on said balance wheel and the other member of said magnetic circuit being disposed in a fixed position with respect to said moving member to provide magnetic reaction between the two members during relative motion therebetween, said electronic circuit compirsing a two stage transistor amplifier having an input circuit and an output circuit, a bridge circuit including three resistive elements and the coil, a feedback circuit and a source of energizing potential, the output of said amplifier being serially connected to one diagonal of said bridge and said source, the feedback circuit being serially connected between the input of said amplifier and the other diagonal of said bridge, said circuit being disposed to self-oscillate at a second natural resonant frequency, said coil being adapted to receive output energy from said amplifier to generate a magnetic field about said coil to react with the field of the permanent magnetic array to supply mechanical energy to the magnetic circuit and to receive magnetic pulses induced therein as a result of the relative motion between the coil and the array and to convey said induced pulses to the input circuit of the amplifier by way of the feedback circuit whereby said amplifier self-oscillates at its natural resonant frequency when initially energized to set the balance wheel into oscillation and thereafter oscillates in synchronism with the natural resonant frequency of the oscillating balance wheel assembly.

References Cited in the file of this patent

UNITED STATES PATENTS

| | | |
|---|---|---|
| 2,435,487 | Adler | Feb. 3, 1948 |
| 2,776,372 | Ensink et al. | Jan. 1, 1957 |
| 2,820,199 | Greefkes | Jan. 14, 1958 |
| 2,864,062 | Schaffner | Dec. 9, 1958 |
| 2,889,471 | Jackson | June 2, 1959 |
| 2,907,940 | Beyner | Oct. 6, 1959 |
| 2,909,732 | Van Overbeek | Oct. 20, 1959 |

FOREIGN PATENTS

| | | |
|---|---|---|
| 576,719 | Great Britain | Apr. 17, 1946 |
| 746,465 | Great Britain | Mar. 14, 1956 |